JAMES A. ROMAN
ROBERT G. GREEN
JOHN M. KEATING
CHARLES W. PATTEN
INVENTORS

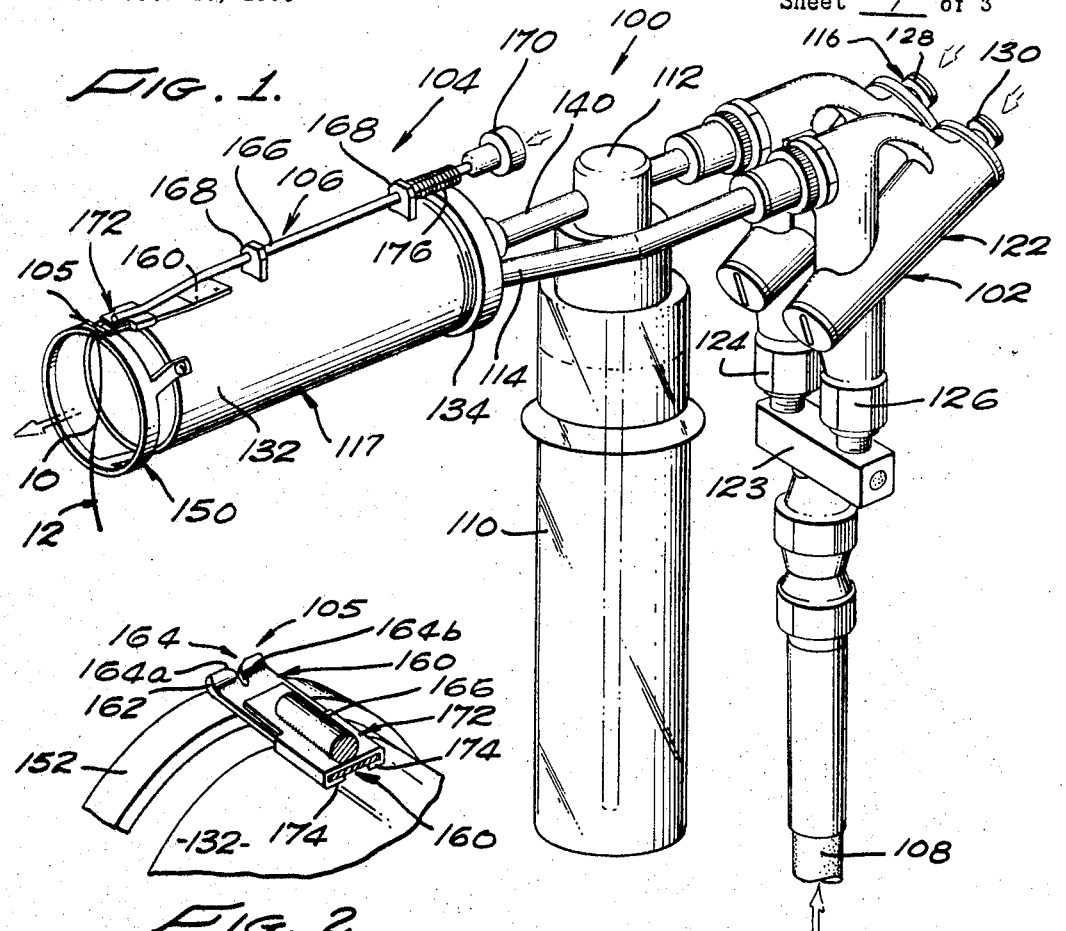
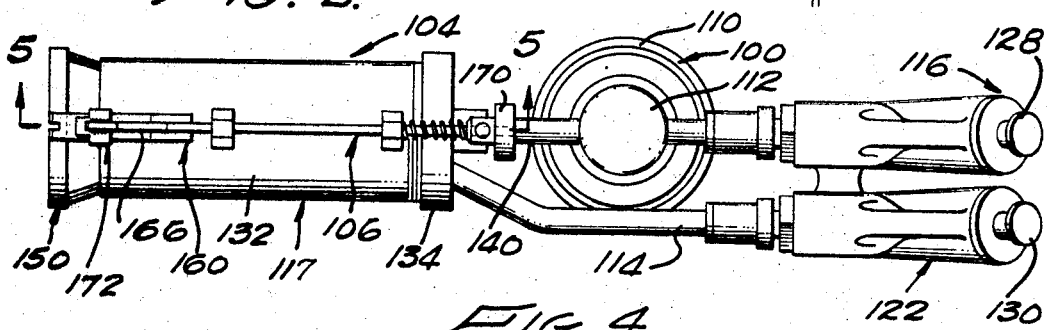
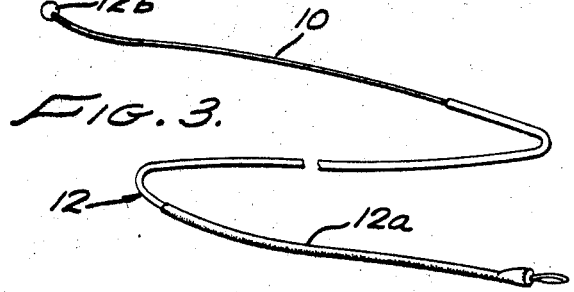
JAMES A. ROMAN
ROBERT G. GREEN
JOHN M. KEATING
CHARLES W. PATTEN
INVENTORS

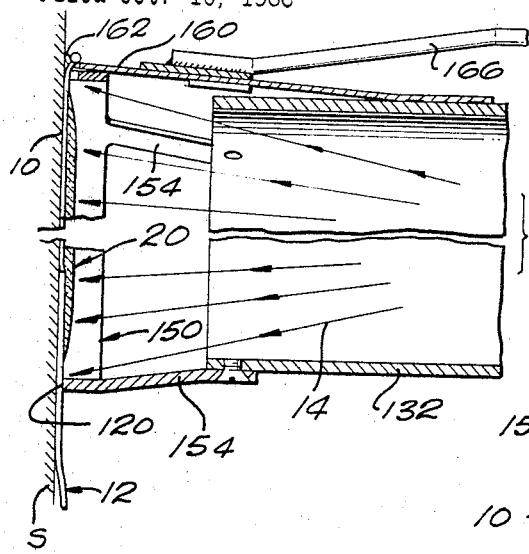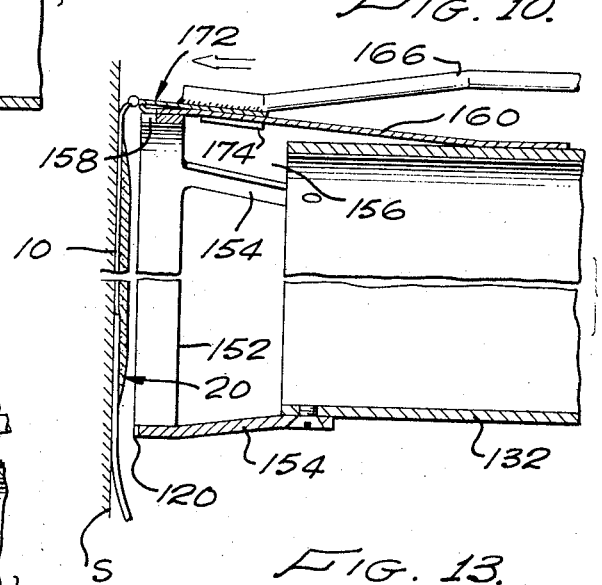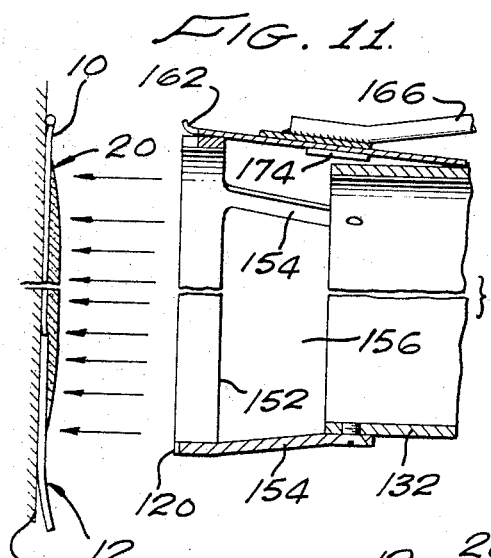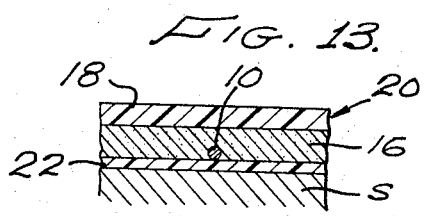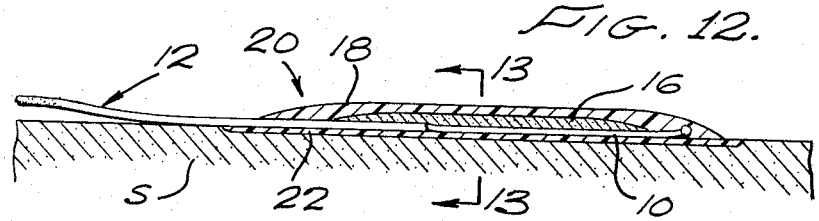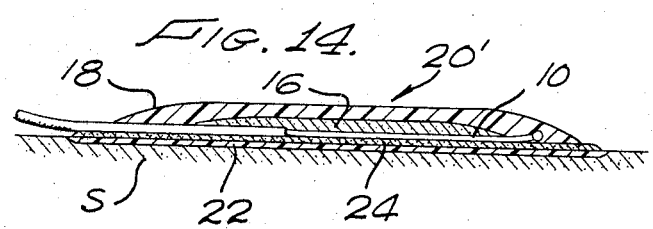

United States Patent Office 3,426,746
Patented Feb. 11, 1969

3,426,746
METHOD AND APPARATUS FOR ATTACHING PHYSIOLOGICAL MONITORING ELECTRODES
Robert C. Seamans, Jr., Deputy Administrator of the National Aeronautics and Space Administration with respect to an invention of John M. Keating, Montclair, James A. Roman, Palmdale, and Robert G. Green and Charles W. Patten, both of Lancaster, Calif.
Filed Oct. 10, 1966, Ser. No. 586,324
U.S. Cl. 128—2.06    20 Claims
Int. Cl. A61b 5/05; B05b 15/04

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to the art of biomedical instrumentation; that is, the art of electrically instrumenting a live subject to permit monitoring of selected physiological functions of the subject. More particularly, the invention relates to a novel biomedical monitoring skin electrode as well as to a novel method and apparatus for applying or forming the electrode on the skin.

Many phases of medical research and treatment involve intermittent or continuous monitoring of various physiological functions which are reflected in corresponding minute electrical potentials or potential differences at the surface of the skin. These biomedical potentials are sensed, amplified, and recorded or otherwise converted into information from which the physiological functions being monitored may be assessed. Such biomedical potential monitoring techniques require the application of sensors or electrodes to selected portions of the skin. These electrodes are equipped with leads for transmitting the biomedical potential signals from the electrodes to the external test equipment which utilizes the signals. In some cases, the electrode leads are directly connected to the recorder or other signal transducer which converts the biomedical potentials into usable information. In other cases, the electrode leads are connected to a radio transmitter which transmits the biomedical potential signals to a remote receiver. This receiver, in turn, is connected to the recorder or other signal transducer.

Biomedical potential monitoring techniques of the kind under discussion are employed for a variety of medical applications. One of the more recent and important of these applications, and one which presents the most severe operating environment for the skin electrodes employed in such monitoring techniques, involves the remote physiological monitoring of space vehicle crew members. For this reason, the invention will be described in connection with this particular application. However, it should be understood at the outset that this disclosed application of the invention is intended to be purely illustrative and not limiting in nature and that the improvements contributed by the invention may be utilized to advantage in all of the other biomedical monitoring applications.

The advent of manned spaced flight has rendered critical the need for frequent or continuous biomedical monitoring of space crew members who, in space flight, are exposed to a new and relatively unexplored environment which is incompatible with human life without multiple protective devices. During space flight, direct medical assistance is unavailable for long periods of time, and decisions regarding the necessity, from the medical standpoint, of aborting or altering a particular flight plan must be made quickly and accurately. These factors have initiated research programs aimed at adapting clinical monitoring techniques to the space environment and developing improved methods of assessing the physiological state of space crew members.

The medical aspects of biological monitoring techniques are well understood in the art and thus need not be treated in detail here. Suffice it to say that such techniques utilize skin electrodes for the purpose of sensing the electrical potentials or potential differences which exist at the surface of the skin and which are related to the physiological state of the subject. Accurate physiological assessment of a subject, however, particularly a space crew member, imposes certain stringent requirements on the overall biomedical monitoring system and especially on the skin electrodes which are employed in the system. Since the overall biological monitoring system requirements are well recognized and are involved, in large part, with the skin electrodes, and further since the present invention is directed to such electrodes, only the electrode requirements will be discussed herein. Moreover, the electrode requirements will be discussed in connection with remote physiological monitoring of space crew members since, as just noted, this particular application forms a primary application of the invention and presents the most severe operating environment for biological monitoring electrodes. Accordingly, an electrode which satisfies the following requirements will inherently be suitable for other uses, notably normal clinical use.

The biomedical electrode requirements for space applications differ from those for normal clinical applications in several important respects. Thus, motion of the subject is the rule rather than the exception. In addition, the electrodes are subjected to severe mechanical forces and stresses as the results of acceleration loads, vibration, and buffeting. Another difference between space and clinical electrode requirements resides in the fact that the electrodes applied to space crew members are subjected to frequent direct contact with other objects. This is due to interference of the electrodes with flight clothing or emergency equipment which space crew members are normally required to wear. Moderate to heavy perspiration is also the rule, rather than the exception, during space flight in high performance space vehicles. This is the result of the protective equipment worn by, and the mental, emotional, and physical stress imposed on space crew members. Another unique requirement of biomedical monitoring electrodes designed for space applications is that these electrodes must function completely independently without adjustment or correction for long periods of time.

These unique functional requirements of biomedical monitoring electrodes designed for space applications give rise to corresponding unique mechanical requirements. Thus, the electrodes must be relatively small for the reason that space crew members are normally burdened with a great many items of hardware vital to their safety, and the means employed for biomedical instrumentation of the crew members, particularly for the monitoring electrodes, should not be of such large size as to add appreciably to this burden. The monitoring electrodes should also be relatively light in weight not only to minimize the burden imposed on space crew members by the electrodes but also to minimize the response of the electrodes to the vibrations, acceleration forces, impacts, and other high intensity forces and motions encountered in space flight. Such response, if excessive, results in changes in the electrode impedance and polarization voltage which results in a corresponding base line shift on the recording or tracing produced by the biomedical monitoring equipment. A particularly important requirement of electrodes designed for space applications is firm anchorage to the skin. This requirement stems from the fact that electrodes are subjected to heavy perspiration, much activity, and mechanical shock and other forces, all of which factors tend to dislodge the electrodes. In addition, biomedical monitoring eletrodes should be simple to apply and, once applied, should not cause skin irritation or other discomfort or injury to the subject, even when worn for prolonged periods of time.

In addition to the above functional and mechanical requirements, biomedical monitoring electrodes must satisfy certain electrical requirements. Thus, the impedance of the electrodes should be related to the input impedance of the amplifying equipment embodied in the biomedical monitoring system in such manner that attenuation of the signal due to electrode impedance is negligible. This impedance factor is determined, primarily, by the size of the electrode and by appropriate preparation of the skin area to which the electrode is applied. In addition, the resistance changes exhibited by the electrodes in response to varying external pressures on the electrodes should be minimal.

Finally, biomedical monitoring electrodes are applied to different areas of the body. The surface contour, texture, and other surface conditions of the skin at these various areas may, and generally do, vary greatly. Moreover, the surface conditions of the skin at any given area may, and generally do, vary greatly from one subject to another. Accordingly, monitoring electrodes must be capable of application and adherence to as well as efficient electrical contact with, skin areas of widely varying surface contour, texture, and other surface conditions.

It is a general object of this invention to provide a biomedical monitoring electrode which satisfies the foregoing and other requirements of such electrodes, as well as a novel method of, and apparatus for applying or forming the electrode on the skin.

A more specific object of the invention is to provide an improved biomedical monitoring electrode, as well as a novel method of and apparatus for applying or forming the electrode, which involve initial placement of the bare end of an electrode lead over and in close proximity to the skin and subsequent spraying of a relativley fast-drying electrically conductive adhesive over the lead and onto the underlying skin area in such a way as to form on the skin a patch-like layer of the adhesive which adheres to the skin and encapsulates the bare lead end to form a skin electrode.

Another object of the invention is to provide biomedical electrode forming or applying apparatus of the character described which comprises a novel spray gun for discharging the adhesive spray and a novel spray head on the gun for shaping the adhesive spray to the electrode-forming cross section and releasably locating the bare end of the electrode lead in an initial position relative to the spray head, wherein the lead end is situated in the spray path and is disposed to be pressed into electrically conductive relation with the skin by placement of the spray gun in spraying position relative to the skin.

A related object of the invention is to provide a biomedical electrode spray apparatus of the character described wherein the spray head is equipped with means for ejecting the electrode lead from the spray head after application of the electrode, thus to prevent separation of the lead from the electrode adhesive when removing the spray gun.

Another related object of the invention is to provide a biomedical electrode spray apparatus of the character described which is equipped with means for selectively directing drying air over the formed electrode to accelerate drying of the electrode adhesive.

A further object of the invention is to provide a biomedical monitoring electrode, as well as a method of and apparatus for applying or forming the electrode on the skin, which are relatively simple in practice and construction, capable of practice and operation by relatively unskilled personnel, satisfy the most stringent electrode requirements, whereby the electrode is suitable for both clinical and space use, and which are otherwise ideally suited to their intended purposes.

Other objects, advantages and features of the invention will become readily evident as the description proceeds, taken in conjunction with the accompanying drawings in which:

FIGURE 1 is a perspective view of a biomedical electrode spray apparatus according to the invention;

FIGURE 2 is an enlarged perspective view of an electrode lead anchoring means embodied in the spray apparatus;

FIGURE 3 is an enlarged view of the electrode lead itself;

FIGURE 4 is a top plan view of the electrode spray apparatus in FIGURE 1;

FIGURE 9 is a view similar to FIGURE 8 illustrating the spray head in electrode spraying position relative to the skin during spraying of an electrode on the skin;

FIGURE 10 is a view similar to FIGURES 8 and 9 illustrating the electrode lead being ejected from the spray head after spraying of the electrode on the skin;

FIGURE 11 is a view similar to FIGURES 8–10 illustrating the spray head retracted from the skin for directing drying air over the completed electrode;

FIGURE 12 is an enlarged section through the completed electrode;

FIGURE 13 is an enlarged section taken on line 13—13 in FIGURE 12; and

FIGURE 14 is a section through a modified biomedical electrode according to the invention.

Figure 5:
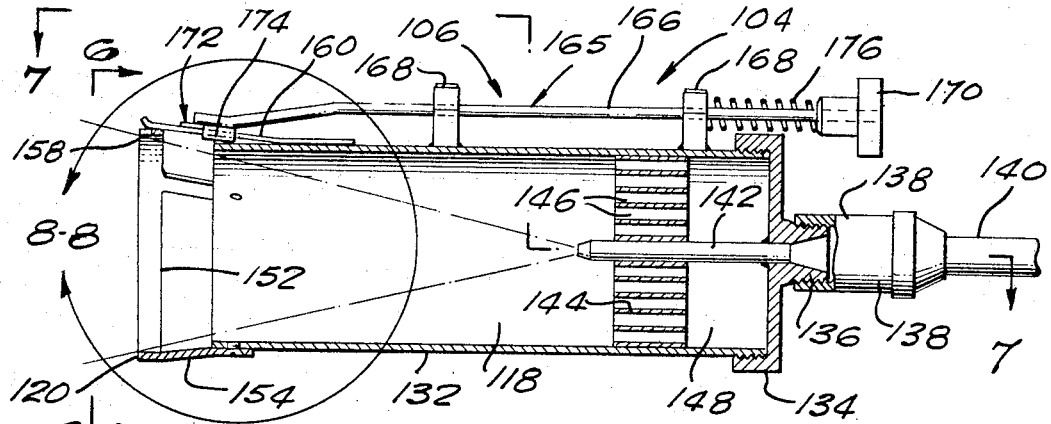
FIGURE 5 is an enlarged section through the spray head of the electrode spray apparatus, taken on line 5—5 in FIGURE 4.
Figure 6:
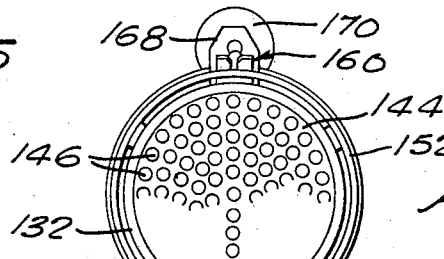
FIGURE 6 is a front end view of the spray head looking in the direction of the arrows on line 6—6 in FIGURE 5.
Figure 7:
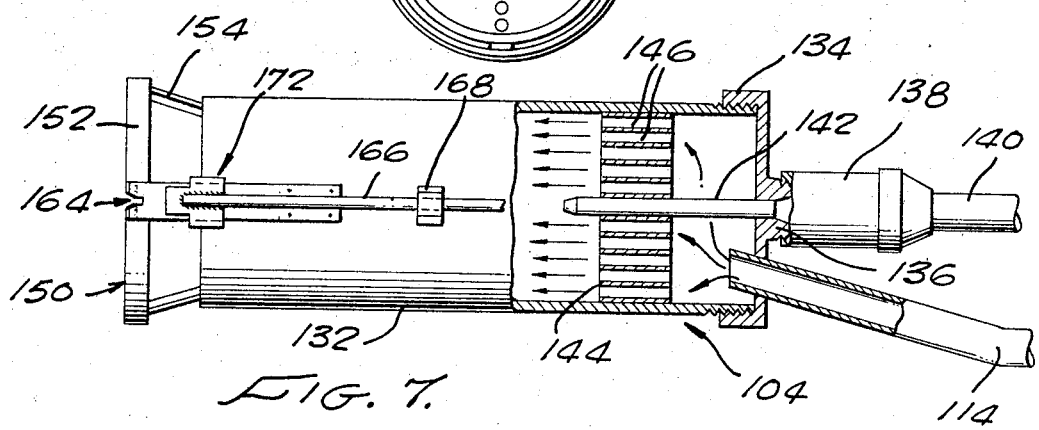
FIGURE 7 is a top plan view, partly in section, of the spray head, taken on line 7—7 in FIGURE 5.
Figure 8:
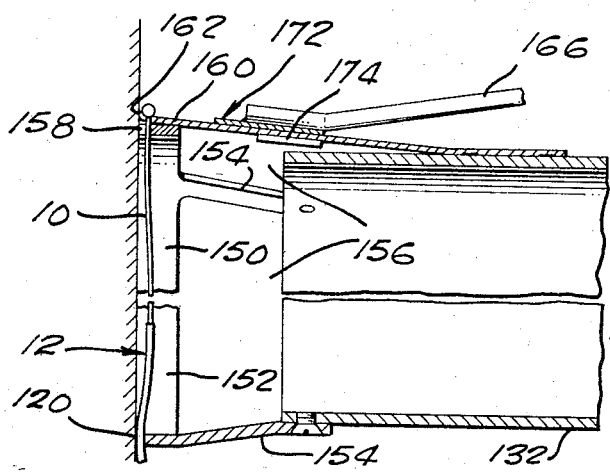
FIGURE 8 is an enlargement of the area encircled by the arrow 8—8 in FIGURE 5 illustrating the front end of the spray head with the electrode lead in initial position on the spray head.

Briefly, the present method of applying or forming a biomedical electrode on the skin S of a subject involves placement of the bare end 10 of an electrode lead 12 in an initial position over and in close proximity to a selected local area of the skin, as shown in FIGURE 8. A spray 14 of relatively fast-drying electrically conductive adhesive is then directed over the lead and onto the underlying skin area, in the manner illustrated in FIGURE 9, to form on the skin a patch-like layer 16 of the adhesive which adheres to the skin and encapsulates the bare end of the lead, as shown. Finally, the adhesive path is dried by directing a stream of drying air over the adhesive, after which a layer 18 of electrical insulating substance is applied over the adhesive layer, as by spraying the substance from an aerosol can. The completed electrode 20 is illustrated in FIGURE 12 and comprises the inner electrode lead 12, the intermediate adhesive layer 16, and the outer insulating layer 18. This insulating layer completely covers the adhesive layer, as shown.

According to the preferred practice of the invention, the skin area to which the electrode is to be applied is first cleaned and coated with a film 22 of electrically conductive jelly or paste, such as that which is currently available in the market under the tradename Offner Paste. This paste fills in the pores of the skin to form a relatively smooth skin surface to which the electrode may adhere with maximum strength and minimum electrical resistance between the electrode and the skin. In this regard, one unique advantage of the present method of forming or applying a biomedical electrode resides in the fact that the kinetic energy or velocity of the adhesive particles in the adhesive spray 14 drives some of these particles through the conductive paste into direct contact with the underlying skin, thus to assure an effective adhesive bond and minimum electrical resistance between the electrode and the skin. According to an alternative practice of the invention, a thin layer 24 of adhesive is sprayed onto the skin before application of the electrode lead encapsulating layer 16, as shown in FIGURE 14.

Various electrically conductive adhesives may be ememployed in the present electrode forming technique. The preferred adhesive, however, will consist of the following ingredients combined in the indicated proportions.

43 grams Duco household cement (Dupont S/N 6241)
43 grams silver powder (Handy and Harmand silflake #135 or equivalent)
125 millilitres (4 oz.) acetone This particular adhesive composition provides an electrode which satisfies all of the requirements, noted earlier, of biomedical monitoring electrodes, particularly those intended for aerospace use. Also, an electrode having this particular adhesive composition may be quickly and easily removed from the skin by washing the skin area containing the electrode with acetone.

Reference is now made to FIGURES 1–11 illustrating a biomedical electrode spray apparatus 100 according to the invention for practicing the above described biomedical electrode applying forming method. Briefly, this apparatus comprises a spray gun 102 for discharging the adhesive spray 14 and a spray head 104 on the gun for shaping and directing the spray and releasably locating the bare end 10 of the electrode lead 12 in an initial position relative to the spray head, wherein the lead end is situated in the path of the adhesive spray 14 and is disposed to be pressed into electrically conductive relation with the area of the skin S to which the electrode is to be applied when the spray head is placed in its spraying position of FIGURES 8 and 9. The electrode lead 12, when in this initial position on the spray head, is releasably anchored at its extremity to the spray head 104 by anchoring means 105. Mounted on the spray head are means 106 for ejecting the electrode lead from the spray head, in the manner illustrated in FIGURE 10, after spray application of the electrode adhesive to the skin, thus to prevent separation of the lead from the adhesive with the spray head.

The spray gun 102 of the illustrated electrode spray apparatus 100 has an air hose 108 through which compressed air is delivered to the gun, a container 110 for holding a quantity of the electrically conductive adhesive, an aspirator 112 for aspirating the adhesive from the container and discharging an atomized adhesive spray into the spray head 104 in response to air flow through the aspirator, an air tube 114 extending from the spray gun to the spray head for discharging adhesive drying air into the spray head, and valve means 116 for selectively communicating the air hose 108 to the aspirator 112 and the drying air tube 114. The spray head 104 has a generally cylindrical barrel 117. Extending axially through this barrel is a spray passage 118 which opens through the front end of the barrel.

Briefly, in operation of the illustrated electrode spray apparatus 100 to apply a present biomedical electrode 20 to the skin S, the insulation 12a of the electrode lead 12 is stripped from one end of the lead to expose the bare end 10 of the lead conductor. This bare end of the electrode lead is then engaged with the lead anchoring means 105 at the front end of the spray head 104, and the lead is placed in an initial position relative to the barrel, wherein the lead extends generally diametrically across the front end of the spray passage 118 through the barrel. In this initial position, the electrode lead extends radially across the annular front edge of the barrel, at a position diametrically opposite the lead anchoring means 105. Preferably, the front edge of the barrel is notched at this latter position, as illustrated at 120 to seat the lead in such a way that the lead protrudes beyond the front barrel edge.

At this point, the spray apparatus 100 is placed in its spraying position of FIGURES 8 and 9, wherein the front end of the spray barrel 117 overlies the area of the skin S on which the biomedical electrode 20 is formed. As noted earlier, and illustrated in FIGURE 9, placement of the spray barrel in this spraying position is effective to press the bare end 10 of the electrode lead 12 into intimate, electrically conductive relation with the skin. The valve means 116 on the electrode spray gun 102 are now operated to direct compressed air through the spray gun aspirator 112, thus to discharge the adhesive spray 14 through the spray barrel 117, over the bare electrode lead end 10, and onto the underlying area of the skin. This action coats the skin area with the adhesive layer or patch 16 which encapsulates the bare lead end 10, as described earlier and illustrated in FIGURE 9. After an adhesive layer 16 of the proper thickness has thus been deposited on the skin, the electrode lead ejection means 106 are operated to release the electrode lead from the spray head 104. The spray head is then retracted a small distance from the skin to its drying position of FIGURE 11.

Finally, the valve means 116 of the spray gun 102 are operated to direct compressed air from the air hose 108 into the spray barrel 117 for drying the adhesive layer 16 on the skin, thus to firmly anchor the electrode lead 12 to the skin. The biomedical electrode 20 is then completed by spraying or otherwise applying the electrical layer 18 over the adhesive layer 16.

Referring now in greater detail to the illustrated electrode spray apparatus 100, the spray gun 102, except for its drying air tube 114 and selectively operable valve means 116, is conventional and thus requires no detailed explanation. Suffice it to say that the spray gun has a body 122 including an air inlet manifold 123 connected to the air hose 108. Leading from this manifold are a pair of branch inlets 124, 126 which communicate with the adhesive aspirator 112 and the drying air tube 114, respectively. The spray gun valve means 116 comprise two separate air valves 128 and 130 mounted in the spray gun body 122. These air valves have external plungers, as shown, against which finger pressure may be exerted to open the valves. Valve 128 controls air flow from the branch air inlet 124 to the adhesive aspirator 112. Valve 130 controls air flow from the branch air inlet 126 to the drying air tube 114.

The spray barrel 117 of the electrode spray apparatus 100 has a cylindrical wall 132 closed at its rear end by an end cap 134. Extending from the rear end of this end cap is an externally threaded coupling element 136 which is threaded in a fitting 138 carried by the adhesive spray outlet tube 140 of the spray gun aspirator 112. Fixed at its rear end in and extending forwardly from the coupling element 136, through and along the axis of the spray barrel 117, is an adhesive nozzle 142. Spray barrel 117 contains an air defuser plate 144 which extends across the spray passage 118 in the barrel, a short distance forwardly of the barrel end cap 134. Extending axially through this diffuser plate are a multiplicity of uniformly distributed air passages or ports 146 which communicate the chamber space 148 behind the plate to the spray passage 118 in front of the plate. The passage in the drying air tube 114 opens to the chamber space 148. The adhesive nozzle tube 142 extends centrally through and slightly beyond the front side of the diffuser plate 144.

Fixed to the front end of the cylindrical wall 132 of the spray barrel 117 is a barrel extension 150. This barrel extension includes a forward ring 152 with three rearwardly extending legs 154. The barrel extension legs 154 are secured to the front end of the cylindrical barrel wall 132. The barrel extension ring 152 is located a distance forwardly of this wall so as to define between the ring and wall a number of radially opening vents 156. During operation of the electrode spray apparatus 100, the air contained in the emerging adhesive spray 14 exhausts through the radial vents 156, while the adhesive particles in the spray continue to travel forwardly through the front end of the spray barrel.

The electrode lead anchoring means 105 on the spray barrel 117 comprise a forwardly opening notch 158 in the front end of the spray barrel extension ring 152. Fixed to the front end of and extending forwardly from the spray barrel wall 132, in axial alignment with the notch 158, is a spring blade 160. This blade has an outwardly curled front end 162, the front convex surface of which is substantially flush with or located just slightly behind the front end of the spray barrel extension ring 152. Extending longitudinally into the front end of the spring blade 160 is a slot 164 having a V-shaped front end 164a and a narrow rear end 164b with parallel sides. The spray barrel extension ring notch 158 and the spring blade slot 164 are radially aligned. The electrode lead 12 is anchored in the spring blade slot 164 by forming a small bead 12b of epoxy or other material on the extremity of the lead and inserting the lead into the slot in such manner that the bead seats behind the outwardly curled end 162 of the blade. This bead also inhibits endwise movement of the lead from the adhesive layer 16 of the completed electrode 20.

The electrode lead ejection means 106 on the electrode spray barrel 117 comprise a spring loaded plunger 165 including a rod 166 which extends axially of and is slidably guided in a pair of bearing supports 168 on the spray barrel wall 132. Fixed on the rear end of this rod is a knob 170. Fixed on the front end of the rod is a lead ejector slide or head 172 having side flanges 174 which are bent about the side edges of the spring blade 160, as shown best in FIGURE 2, whereby the head is slidable along the blade. A spring 176 urges the ejector plunger 165 rearwardly to its normal retracted position illustrated in FIGURES 5, 7 and 8. The ejector plunger 165 is movable forwardly against the action of the spring 176 to its forward extended position of FIGURE 10 by finger pressure on the plunger knob 170. During forward movement of the plunger, the front plunger head 172 slides forwardly along the spring blade 160 to eject the electrode lead 12 forwardly from the blade slot 164.

The operation of the electrode spray apparatus 100 is now believed to be obvious. Thus, the first step in using the apparatus involves insertion of the beaded end of the electrode lead 12 into the slot 164 in the spring blade 160 of the lead anchoring means 105 on the front end of the spray head 104. The lead is then trained diametrically across the front end of the spray passage 118 through the head and is engaged in the lower notch 120 in the spray barrel extension ring 152. Thereafter, the front end of the spray barrel 117 is placed over the area of the subject's skin S on which an electrode 20 is to be formed, after which the barrel is moved toward the skin, to its position of FIGURES 8 and 9, thus to press the electrode lead 12 firmly against the skin. After the spray barrel 117 has thus been located in its spraying position, the air valve 128 is depressed to deliver compressed air from the air hose 108 to the adhesive aspirator 112. The resulting air flow through this aspirator aspirates adhesive from the adhesive container 110 of the aspirator, atomizes the adhesive, and discharges the atomized adhesive spray 14 through the spray barrel. This adhesive spray coats the bare end 10 of the electrode lead 12 and the underlying area of the skin S, thus to form on the skin the adhesive layer 16 which encapsulates the bare end of the electrode lead, as illustrated in FIGURES 12 and 13.

After an adhesive layer 16 of the proper thickness has been applied to the skin, the lead ejector plunger 165 is moved forwardly, by finger pressure on the rear knob 170 of the plunger, to eject the lead 12 forwardly from the slot 164 in the lead anchor blade 160. The electrode spray apparatus is then retracted from the skin to locate the spray barrel 117 in its drying position of FIGURE 11. At this point, the air valve 130 is depressed to deliver drying air to the spray barrel. This drying air is directed over the adhesive layer 16 on the skin, thus to dry the adhesive.

The electrode spray apparatus 100 is then removed completely and the biomedical electrode 20 is completed by applying the electrical insulating layer 18 over the adhesive layer 16. As noted earlier, and illustrated in FIGURE 12, this insulating layer completely covers the adhesive layer and the encapsulated bare end 10 of the electrode lead 12.

As was explained earlier, the surface of the skin S on which the present biomedical electrode is to be formed is initially cleaned and coated with a thin film 22 of suitable electrically conductive paste which fills in the pores of the skin and provides a smooth surface on the skin for receiving the electrode. This enhances the electrical characteristics of the electrode as well as the adhesive bond between the electrode and the skin. In this regard, it will be recalled that a significant feature of the invention resides in the fact that some of the adhesive particles in the adhesive spray 14 are driven through the film 22 of conductive paste into direct adhesive contact with the underlying skin, thus to achieve an adhesive bond of maximum strength and minimum electrical resistance between the electrode and the skin.

As noted earlier, in some cases it may be desirable to spray a thin film or layer 24 of adhesive onto the skin prior to application of the electrode lead 12 to the skin. FIGURE 14 illustrates a cross section through an electrode 20′ according to the invention embodying such an initial adhesive layer on the skin. The remaining structure of the electrode is identical to that described above.

Although the spray device illustrated in detail herein has been a spray gun modified by attachment of a spray shaping barrel, it will of course be realized that any suitable spray device could be equivalently modified. Thus, instead of using an externally pressurized aspirator gun, the spray head 104 could be simply attached to an aerosol container or any other desired spray device.

While the instant invention has been shown and described herein in what is conceived to be the most practical and preferred embodiments, it is recognized that departures may be made therefrom in the scope of the invention, which is therefore not to be limited to the details disclosed herein, but is to be afforded the full scope of the claims.

What is claimed is:
1. The method of applying a biomedical electrode to the surface of the skin which comprises the steps of:
  locating the bare end of an electrode lead over and in close proximity to a selected area of the skin; and
  directing a spray of relatively fast drying electrically conductive adhesive over said bare lead end and onto said skin area in such manner as to form on said area a patch-like layer of said adhesive which adheres to the skin and encapsulates said bare lead end.
2. The method according to claim 1 wherein:
  said locating step comprises initially coating said skin area with a relatively thin film of electrically conductive paste to fill in the skin pores within said skin area and thereafter placing said bare lead end in electrical contact with said film.
3. The method according to claim 1 wherein:
  said locating step comprises initially spraying onto said skin area a thin film of said adhesive to fill in the pores within said skin area, and placing said bare lead end in electrical contact with said film.
4. The method according to claim 1 including the additional step of:
  applying an outer layer of electrical insulating substance over said adhesive layer.
5. A spray head for a spray gun for applying a biomedical electrode to the surface of the skin by locating the bare end of an electrode lead over and in close proximity to a selected area of the skin and thereafter spraying a relatively fast-drying adhesive over said bare lead end and onto said skin area in such manner as to form on said skin area a patch-like layer of said adhesive which adheres to the skin and encapsulates said bare lead end, said spray head comprising:
- a spray shaping barrel through which the adhesive spray emerges from said spray gun;
- said barrel being adapted to be located in a spraying position wherein the front end of said barrel overlies said skin area and said spray barrel having a spray passage opening through said front end for confining and directing onto said skin area the adhesive spray from said spray gun; and
- means at the front end of said barrel for releasably locating the bare end of said electrode lead relative to said barrel in an initial position wherein said lead end extends across the front end of said spray passage and is disposed to be located in electrical conductive relationship with the skin by placement of said barrel in said spraying position.

6. A spray head according to claim 5 wherein:
said barrel terminates at its front end in a forwardly presented annular edge;
said lead locating means comprise anchoring means at one position about said front barrel edge for releasably gripping the extremity of said electrode lead; and
said lead when in said initial position extends generally diametrically across the front end of said spray passage and across said front barrel edge approximately diametrically opposite said gripping means.

7. A spray head according to claim 5 wherein:
said barrel has at least one lateral vent opening adjacent its front end.

8. A spray head according to claim 5 including:
lead ejection means mounted on and operable from the rear end of said barrel for forcibly ejecting said electrode lead from said barrel.

9. A spray head according to claim 5 wherein:
said barrel terminates at its front end in a forwardly presented annular edge;
said electrode lead has a bead at the extremity of the bare end thereof;
said lead locating means comprise anchoring means having a forwardly opening slot at one position about said front barrel edge for receiving said lead adjacent said bead;
said lead when in said initial position extends generally diametrically across the front end of said spray passage and across said front barrel edge approximately diametrically opposite said anchoring means; and
said slot being dimensioned to restrain said lead against endwise movement from said slot.

10. A spray head according to claim 9 including:
lead ejection means mounted on and operable from the rear end of said barrel for forcibly ejecting said lead forwardly from said lead anchoring slot.

11. A spray head according to claim 10 wherein:
said lead ejection means comprise a spring loaded plunger extending axially of and supported for endwise movement relative to said barrel, a knob on the rear end of said plunger against which finger pressure may be exerted to urge said plunger forwardly against spring pressure, and a lead ejector head on the forward end of said plunger movable forwardly along said slot to eject said electrode lead forwardly from said slot upon forward movement of said plunger relative to said barrel.

12. A spray head according to claim 5 wherein:
said barrel has a rear inlet for connection to the adhesive spray outlet of said spray gun and a second inlet for connection to a source of pressurized air for drying said adhesive layer on the skin.

13. A spray head according to claim 12 wherein:
said barrel includes an internal apertured diffuser plate extending transversely across said spray passage adjacent the rear end thereof, an adhesive spray nozzle extending centrally through said diffuser plate and communicating at its rear end with said adhesive inlet; and
said drying air inlet opens to said spray passage behind said diffuser plate.

14. Spray apparatus for applying a biomedical electrode to the surface of the skin by locating the bare end of an electrode lead over and in close proximity to a local area of the skin and thereafter spraying a relatively fast-drying electrically conductive adhesive over said bare lead end and onto said skin area in such manner as to form on said area a patch-like layer of said adhesive which adheres to the skin and encapsulates said bare lead end, said apparatus comprising:
- a spray device for discharging a confined spray of said adhesive;
- said spray device being adapted to be placed in a spraying position relative to said skin area, wherein said skin area is located in the path of the adhesive spray from said spray device;
- means on said spray device for releasably locating a bare end of said electrode lead relative to said device in an initial position wherein said lead end is located in said adhesive spray path and is disposed in close proximity to said skin area by placement of said spray device in said spraying position; and
- means for selectively conditioning said spray device to discharge said adhesive spray.

15. Biomedical electrode spray apparatus according to claim 14 wherein:
said spray device comprises means for selectively discharging compressed air along said spray path to dry said adhesive layer on the skin.

16. Biomedical electrode spray apparatus according to claim 14 wherein:
said spray device comprises a spray gun including a liquid adhesive container, aspirator means for aspirating adhesive from said container and atomizing said adhesive to produce said adhesive spray in response to air flow through said aspirator, passage means for directing drying air along said spray path, an air inlet line for connection to a source of pressurized air, and valve means for selectively communicating said air line to said aspirator and said drying air passage.

17. Spray apparatus for applying a biomedical electrode to the surface of the skin by locating the bare end of an electrode lead over and in close proximity to a local area of the skin and thereafter spraying a relatively fast-drying electrically conductive adhesive over said bare lead end and onto said skin area in such manner as to form on said area a patch-like layer of said adhesive which adheres to the skin and encapsulates said bare lead end, said apparatus comprising:
- spray gun including a container for said adhesive, an aspirator for aspirating adhesive from said container and atomizing said adhesive to produce an adhesive spray, a drying air passage, an air inlet line for connection to a source of pressurized air, and valve means for selectively communicating said air line to said aspirator and drying air passage; and
- a spray head mounted on said spray gun including a spray shaping barrel having a spray passage opening through the forward end thereof and communicating at its rear end to the adhesive spray outlet of said aspirator and to said drying air passage, said barrel being adapted to be located in a spraying position wherein the front end of said barrel overlies said skin area and said barrel is disposed to confine and direct onto said skin area the adhesive spray from said aspirator, and means at the front end of said barrel for releasably locating the bare end of said electrode lead relative to said barrel in an initial position wherein said lead extends across the front end of said spray passage and is disposed to be located in close proximity to the skin by placement of said barrel in said spraying position.

18. Biomedical electrical spray apparatus according to claim 17 wherein:

said spray barrel terminates at its front end in a forwardly presented annular edge;

said lead locating means comprise anchoring means at one position about said front barrel edge for releasably gripping the extremity of said electrode lead;

said lead when in said initial position extends generally dimetrically across the front end of said spray passage and across the front barrel edge approximately diametrically opposite said anchoring means; and selectively operable lead ejection means on said spray barrel for forcibly ejecting said electrode lead from said anchoring means.

19. Biomedical electrode spray apparatus according to claim 18 wherein:

said electrode lead has a bead at its extremity;

said lead anchoring means comprise a spring blade extending longitudinally of and fixed at its rear end to said barrel and extending forwardly to a position adjacent said front barrel edge, said blade having an outwardly curled front end and a forwardly opening slot extending into said front blade end for receiving said electrode extremity; and said lead ejection means comprise a spring loaded plunger extending longitudinally of and mounted for endwise movement relative to said barrel, an ejector head on the front end of said plunger movable longitudinally of said lead anchor blade between a rear retracted position remote from said blade slot and a forward extended position adjacent the front end of said slot, whereby said head is effective to eject said electrode lead forwardly from said slot upon movement of said head from said retracted position to said extended position, a spring for retracting said plunger relative to said barrel, and a knob on the rear end of said plunger against which finger pressure may be exerted to move said plunger forwardly against spring pressure.

20. Biomedical electrode spray apparatus according to claim 19 including:

an apertured diffuser plate extending across said spray passage adjacent the rear end thereof, an adhesive spray nozzle extending forwardly through said passage from said adhesive inlet and centrally through said diffuser plate, and said drying air passage opening to said spray passage behind said diffuser plate.

References Cited

UNITED STATES PATENTS

| 2,676,841 | 4/1954 | Pahle | 118—301 |
| 2,872,926 | 2/1959 | Alderman | 128—410 |
| 3,020,182 | 2/1962 | Daniels | 29—473.1 X |
| 3,330,694 | 7/1967 | Black et al. | 117—201 |

OTHER REFERENCES

Albin et al., "Electroencephalography and Clinical Neurophysiology," December 1964, vol. 17, No. 6, pp. 696–697, 128/2.06.

German printed application: No. 1,188,240, Mar. 4, 1965, 128/2.1.

WILLIAM E. KAMM, *Primary Examiner.*